(No Model.) 5 Sheets—Sheet 1.
A. G. STEINBRENNER.
CAR DOOR.
No. 588,500. Patented Aug. 17, 1897.
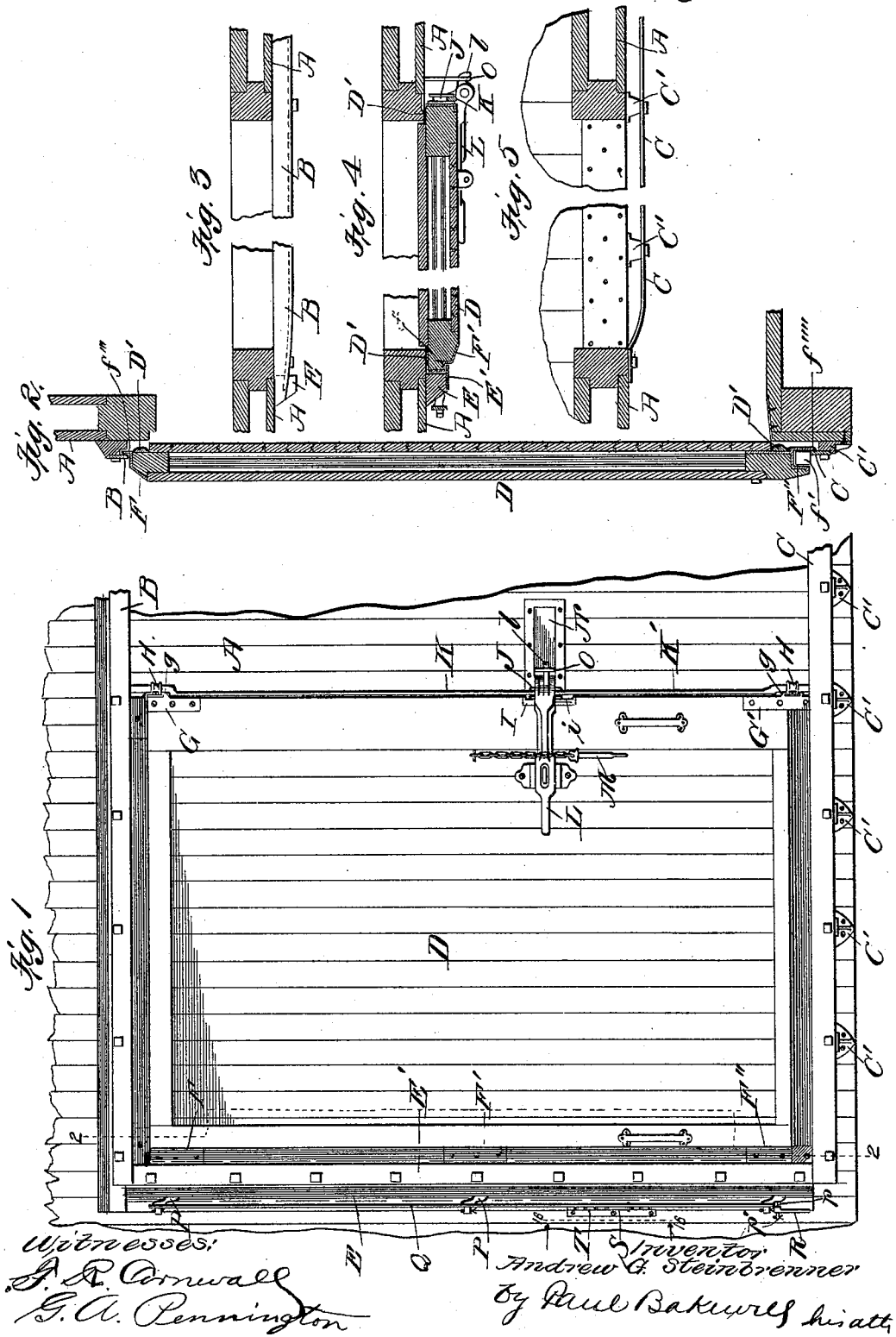
Witnesses:
J. R. Cornwall
G. A. Pennington
Inventor
Andrew G. Steinbrenner
by Paul Bakewell his atty

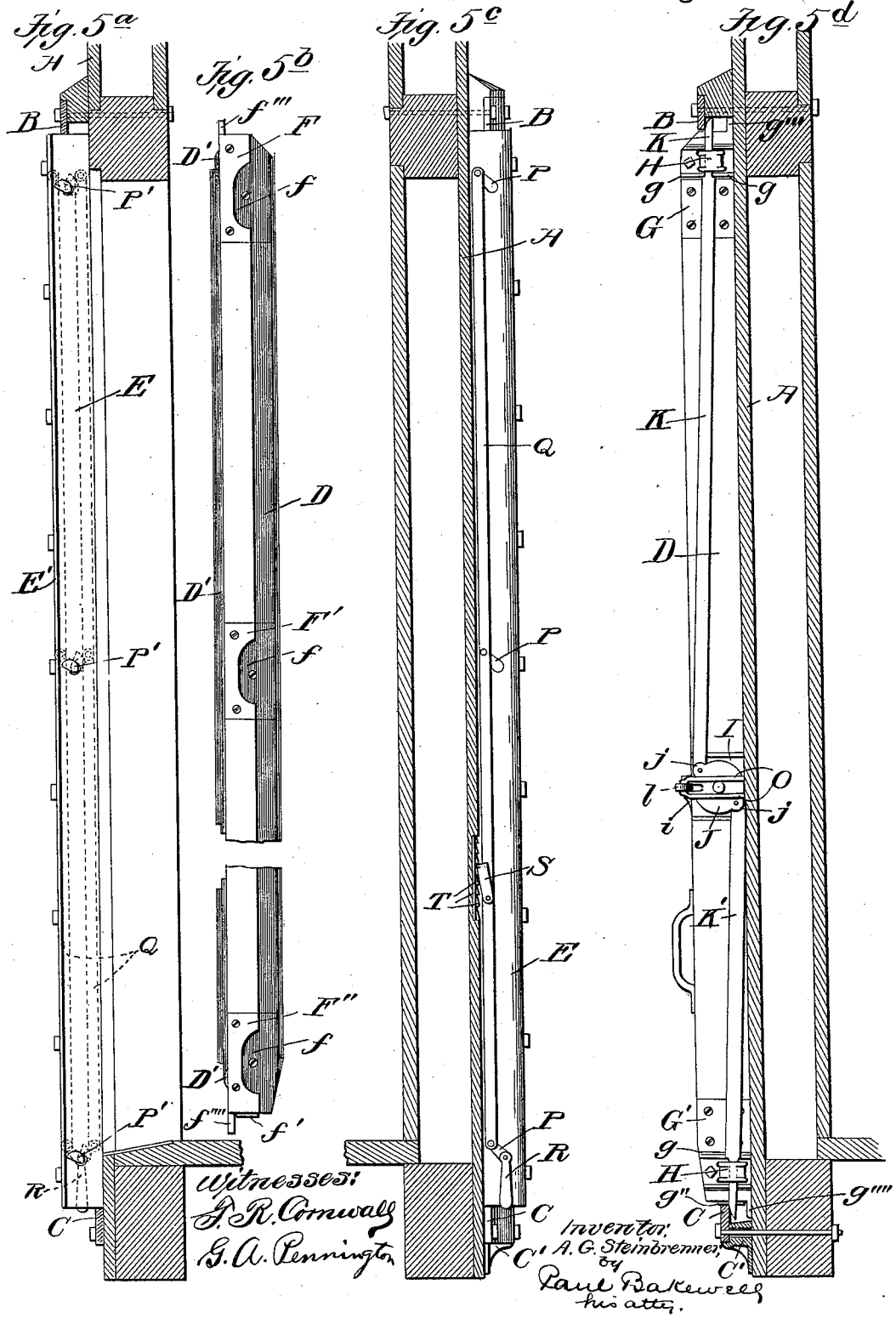

(No Model.) 5 Sheets—Sheet 3.
A. G. STEINBRENNER.
CAR DOOR.
No. 588,500. Patented Aug. 17, 1897.
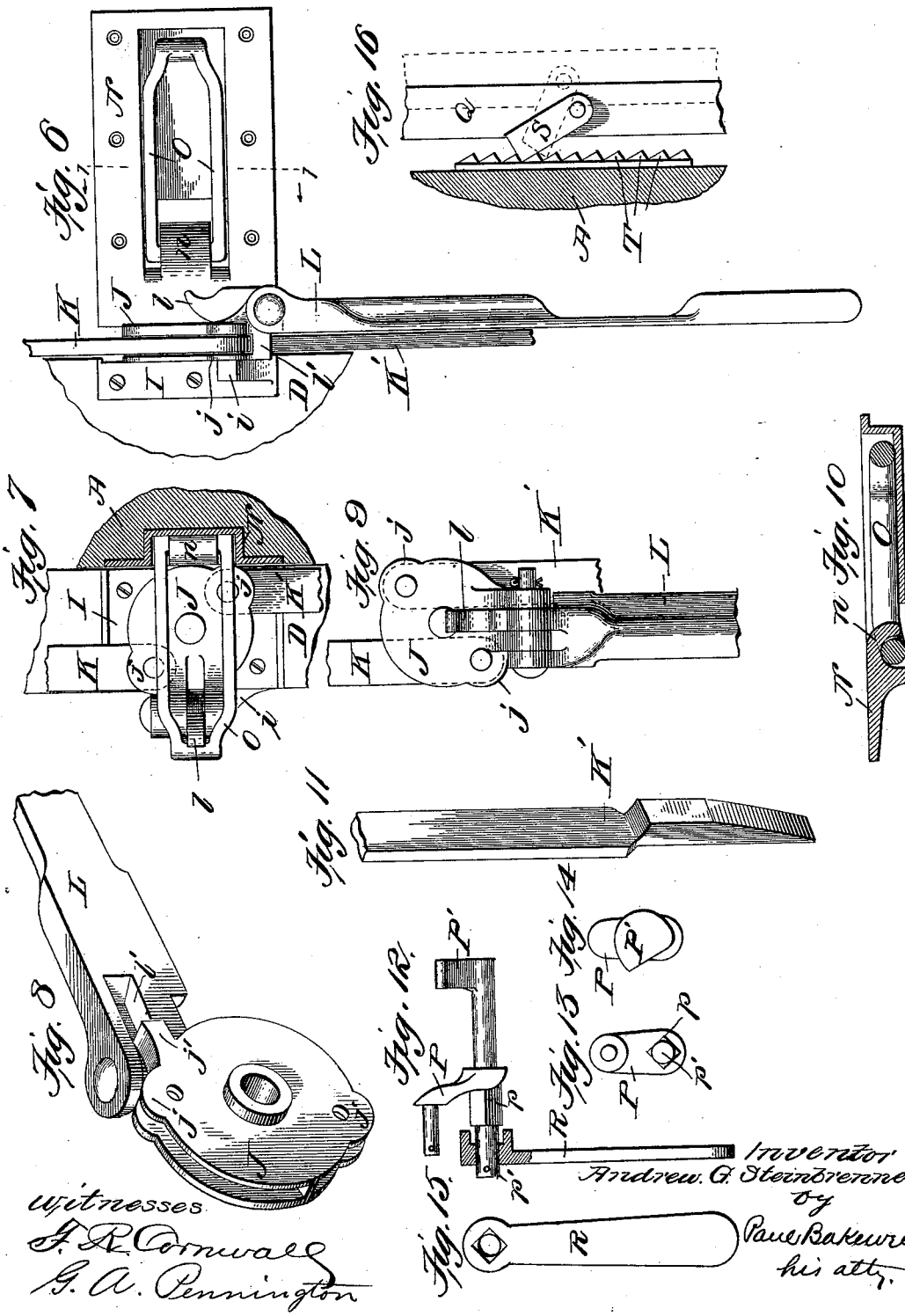
Witnesses
F. R. Cornwall
G. A. Pennington
Inventor
Andrew G. Steinbrenner
by
Paul Bakewell
his atty.

(No Model.)  5 Sheets—Sheet 4.
A. G. STEINBRENNER.
CAR DOOR.
No. 588,500. Patented Aug. 17, 1897.
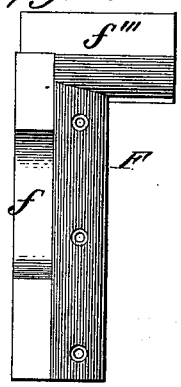
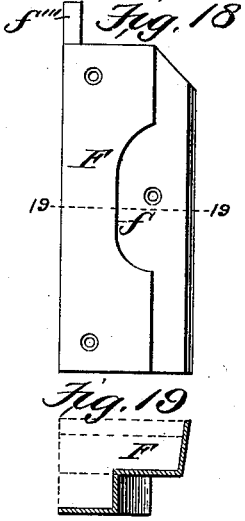
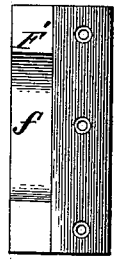
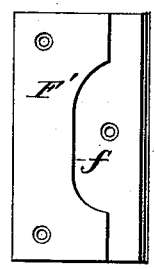
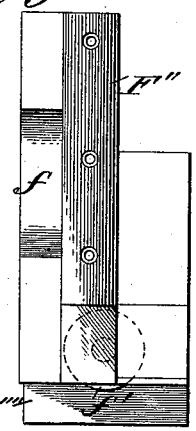
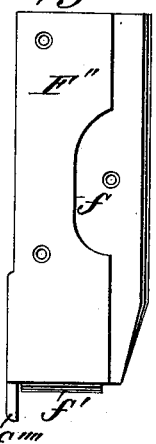
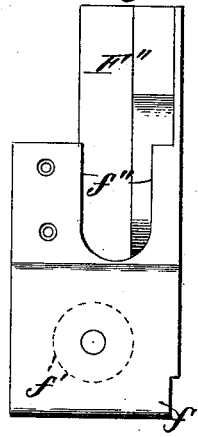
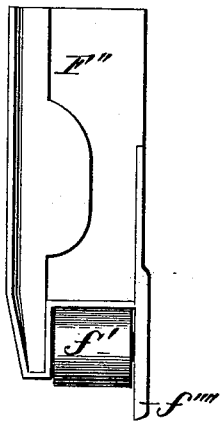
Witnesses:
J. R. Oswald
G. A. Pennington
Inventor
Andrew G. Steinbrenner
by Paul Bakewell
his atty.
THE NORRIS PETERS CO., PHOTO-LITHO., WASHINGTON, D. C.

(No Model.) 5 Sheets—Sheet 5.
A. G. STEINBRENNER.
CAR DOOR.
No. 588,500. Patented Aug. 17, 1897.
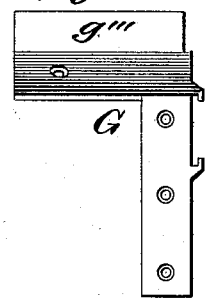
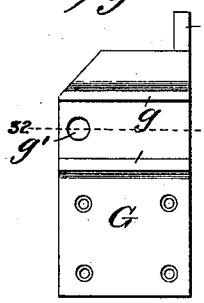
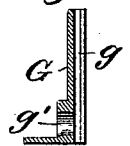
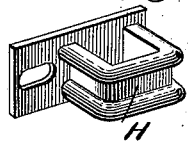
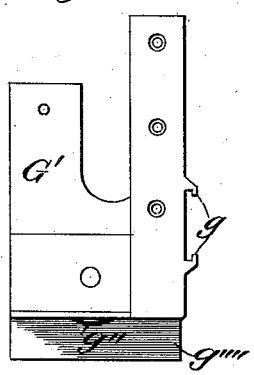
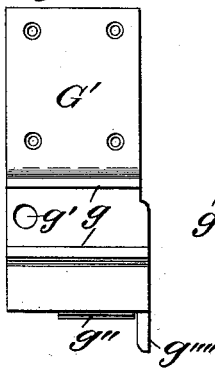
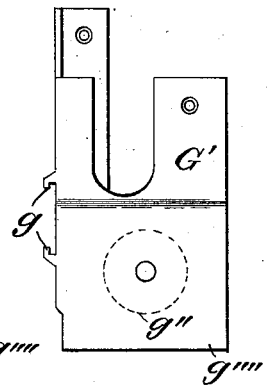
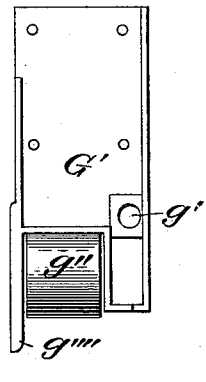
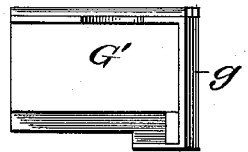
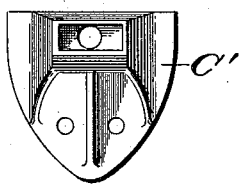
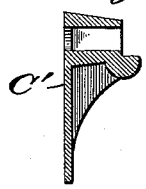
Witnesses
J. R. Cornwall
G. A. Pennington
Inventor
Andrew G. Steinbrenner
by Paul Bakewell
his atty.
THE NORRIS PETERS CO., PHOTO-LITHO., WASHINGTON, D. C.

UNITED STATES PATENT OFFICE.

ANDREW G. STEINBRENNER, OF ST. LOUIS, MISSOURI, ASSIGNOR OF ONE-FIFTH TO ENRIQUE S. BARREIRAS, OF SAME PLACE.

CAR-DOOR.

SPECIFICATION forming part of Letters Patent No. 588,500, dated August 17, 1897.

Application filed November 23, 1896. Serial No. 613,068. (No model.)

*To all whom it may concern:*

Be it known that I, ANDREW G. STEINBRENNER, a citizen of the United States, residing at the city of St. Louis, State of Missouri, have invented a certain new and useful Improvement in Car-Doors, of which the following is a full, clear, and exact description, reference being had to the accompanying drawings, forming a part of this specification, wherein—

Figure 1 is a side elevational view of a portion of a car, showing my improved door in a closed position. Fig. 2 is a vertical sectional view on line 2 2, Fig. 1. Fig. 3 is a horizontal sectional view showing the arrangement of the upper door-track. Fig. 4 is a horizontal sectional view showing the door in a closed position. Fig. 5 is a horizontal sectional view showing the arrangement of the lower door-track. Fig. $5^a$ is an enlarged sectional view taken on line $5^a$ $5^a$, Fig. 3. Fig. $5^b$ is an enlarged elevational view of the front edge of the door. Fig. $5^c$ is an enlarged sectional view on line $5^c$ $5^c$, Fig. 3. Fig. $5^d$ is an enlarged sectional view on line $5^d$ $5^d$, Fig. 4, the rear edge of the door being in elevation. Fig. 6 is a detail view of the loop-fulcrum and pivoted operating-handle on the rear edge of the door. Fig. 7 is a sectional view on line 7 7, Fig. 6. Fig. 8 is a detail view of the rear faces of the rotary disk and operating-handle. Fig. 9 is an elevational view of the front faces of the rotary disk and operating-handle. Fig. 10 is a horizontal sectional view through the loop-fulcrum and its casing. Fig. 11 is a detail view of the outer end of one of the rods operated by the rotary disk. Fig. 12 is a detail view of one of the cams and crank-arms which are adapted to coöperate with the front edge of the door. Fig. 13 is an end view of the same, looking at the crank-arm in advance. Fig. 14 is a rear view of the same, the cam being in advance. Fig. 15 is an inner face view of the pivoted wrench which coöperates with a squared shoulder extending from one or more of the crank-arms and cams. Fig. 16 is a detail view showing the manner of locking the rod mounted upon said crank-arms, said view being taken on line 16 16, Fig. 1. Fig. 17 is a face view of the casting at the upper front edge of the door. Fig. 18 is an edge view thereof. Fig. 19 is a sectional view through the same, taken on line 19 19, Fig. 18. Fig. 20 is a face view of the casting on the front edge of the door, which casting is arranged about the middle of said door. Fig. 21 is an edge view of the same. Fig. 22 is a top plan view of the same. Fig. 23 is a face view of the roller-casting arranged at the lower front edge of the door. Fig. 24 is an outside edge view of the same. Fig. 25 is a rear view of the same. Fig. 26 is an inside edge view of the same. Fig. 27 is a top plan view of the same. Fig. 28 is a sectional view through the roller. Fig. 29 is an edge view of the same. Fig. 30 is a face view of the casting which is arranged at the upper rear edge of the door. Fig. 31 is an edge view of the same. Fig. 32 is a sectional view of the same, taken on line 32 32, Fig. 31. Fig. 33 is a detail view of a sliding adjustable eye through which the rods connected to the rotary disk pass, said eye being mounted in ways on the upper and lower castings at the rear edge of the door. Fig. 34 is a face view of the roller-casting arranged at the lower rear edge of the door. Fig. 35 is an edge view of the same, looking from the outside. Fig. 36 is a rear view. Fig. 37 is an inner edge view. Fig. 38 is a top plan view. Fig. 39 is an elevational view of the lower-track support. Fig. 40 is a sectional view therethrough. Fig. 41 is a top plan view of said support.

This invention relates to a new and useful improvement in car-doors, and is designed more particularly to be used in connection with refrigerator-cars.

The objects of the invention are to provide a sliding door for refrigerator-cars, which door is easy to open and close and which door will practically seal itself when closed and prevent circulation of air therearound, at the same time excluding rain, &c., from the outside.

Another object in view is to so construct the parts of the door that the above can be accomplished and to afford little or no space for the reception of water, which should it freeze would tend to prevent the opening of the door.

With these objects in view the invention consists in the construction and arrangement of crank-arms and cams for coöperating with the front edge of the door to force the same inwardly to make a tight joint, said crank-arms and cams being arranged within the lines of the thickness of the door; in the means for locking these crank-arms and cams in position; in the construction and arrangement of the cams; in the construction and arrangement of rods at the rear edge of the door; the rotary disk for operating said rods; the handle for rotating said disk, which handle also acts as a lever to force the door inwardly and as a hasp to lock the door in position after it has been forced inwardly; in the construction and novel arrangements of the loop-fulcrum and its countersunk casing; and, finally, the invention consists in the construction, arrangement, and combination of the several parts, all as will hereinafter be described, and afterward pointed out in the claims.

In the drawings, A indicates the side wall of the car, to which is secured in any suitable manner an upper track B, whose front edge recedes toward the wall of the car.

C indicates the lower track, which, as shown in Fig. 5, also recedes toward the wall of the car at its front edge. This track C is preferably mounted upon suitable supports C', whose construction is more clearly shown in Figs. 39, 40, and 41, where it will be seen that the upper face is inclined to permit water to run off. The space between these supports is open to prevent the accumulation of water.

D indicates the car-door, which is constructed in any suitable manner, but preferably as shown in the drawings, in which it will be seen by reference to Figs. 1 to 5 that a suitable door-frame is provided, upon which frame is arranged an outer door-facing and an inner door-facing, between the facings being suitable packing. The inner door-facing is raised from the frame of the door, so as to make a rabbeted joint with the door-casing when the door is forced inwardly. Sealing-strips D' are arranged around the inner facing of the door and are adapted to be forced against the outer faces of the door-casing on all four sides, so as to make a tight joint. By making these sealing-strips separate and removable it will be seen that they may be easily replaced by new strips when worn.

E indicates a post secured to the side wall of the car in juxtaposition to the front door-post. E' indicates a strip of metal secured to the outer edge of the post E, behind which strip the front edge of the door is forced in the act of closing it.

F, F', and F" indicate, respectively, the upper, middle, and lower castings, which are arranged upon the front edge of the door. These castings are shown more clearly in detail in Figs. 17 to 27. Each of the castings is provided with a recess or pocket $f$, which opens to the front and outer faces of the door. The lower casting F" is provided with a roller $f'$, with an extended bearing-surface, so as to permit it to be slid laterally over the lower track C, with which it coöperates. For strength this lower casting extends around the rear face of the door, and in order to enable the strips D' to be secured at their mitered joints to the door-frame I preferably cut away the rear wall of this lower casting, as shown at $f''$.

$f'''$ indicates an extension or fin on the upper casting, which extends behind the upper track B, and $f''''$ indicates an extension or fin on the lower casting, which extends behind the lower track C.

G and G' indicate, respectively, castings which are secured to the upper and lower edges at the rear end of the door. These castings have ways $g$ on their edges for the reception of a sliding and adjustable eye H. This eye is made adjustable by a bolt (not shown) which passes through a slot formed in the base-plate of the eye and into an opening $g'$ in the castings. A roller $g''$ is arranged in the lower casting, and this casting also has a back plate extending behind the door, which is cut away to permit the passage of fasteners into the door-frame for the strips.

$g'''$ indicates an extension or fin on the upper casting, which extends behind the top track B, and $g''''$ an extension or fin on the lower casting, which extends behind the lower track C.

I indicates a wear-plate countersunk into the rear edge of the door and provided with a shoulder $i$ on its outer face. Mounted in this wear-plate is a rotary disk J, which consists, preferably, of two members connected by a web, between which members are pivoted rods K and K', extending behind the upper and lower tracks, respectively, said rods passing through the eyes H. The ends of these rods are inclined or formed with cam-faces, as shown in Fig. 11, so that when the rods are forced up and down to coöperate with their respective tracks the cam-faces of the rods force the rear edge of the door inwardly.

L indicates a handle pivoted in ears extending from the rotary disk and to one side of the pivotal point of said disk, said handle being provided with a hooked portion $l$ at its inner end, while the outer end of the handle has a slot formed therein to coöperate with a staple on the car-door.

M indicates a bolt suspended by a chain from the car-door to coöperate with the staple and hasp to lock the latter in place. A suitable slot is formed in the lower end of the bolt, as is common, for the passage of the seal-wire.

N indicates a frame forming a recess or pocket and provided with a nosed portion $n$ near one end, under which nose is placed a loop-fulcrum O, adapted to be swung on said nose as a pivot.

The operation of these parts for securing the rear edge of the door is as follows: The door being closed, the handle L is raised to a horizontal position, which rotates the disk and forces the rods K and K' behind their respective tracks. When the handle is in a horizontal position, the loop is swung outwardly and over the nose *l* of the handle. The handle is now turned back against the side of the door, the lever-loop acting as a fulcrum to force the center of the door inwardly. When the handle is in a closed position, it is above the lug *i* of the wearplate I, which holds the handle in position. The bolt M is now inserted through the staple and the seal attached, as is usual.

In order to give strength to the rotary disk, I preferably increase the metal on the periphery thereof, as at *j*, and these projections, or at least those projections nearest the side wall of the car, are used to force the door outwardly when the rods K and K' are withdrawn. This will be obvious by referring to Fig. 7, where the door appears as locked. When the handle is turned out at right angles to the door, its downward movement to withdraw the cam-faces on the ends of rods K and K' will rotate the disk and force the inner projection against the side wall of the car, which will initially throw the door outwardly.

To add rigidity between the handle and disk when the door is locked, I form a lug or projection *j'* on the disk, as shown in Fig. 8, which coöperates with a recess or pocket *l'* in the handle, as is obvious.

P indicates crank-arms mounted in the post E, the inner ends of which crank-arms have mounted upon them cams P', while the outer ends of the crank-arms have mounted upon them a rod Q, so that when said rod is operated the crank-arms and cams will be operated in unison. On one of the cams, preferably the lower, I form a squared shank, outside of which projects a stud, as shown in Fig. 12, where it will be seen that *p* indicates the squared shank, and *p'* the stud. R indicates a wrench mounted upon the stud and adapted to coöperate with said squared shank. This wrench can be engaged with and disengaged from the squared shank at the will of the operator simply by moving it longitudinally the stud. The wrench offers a leverage for moving the crank-arms and cams.

The cams, which are operated by the crank-arms, coöperate with the recesses or pockets in the castings F, F', and F''' on the front edge of the door and force said front edge of the door inwardly when the crank-arms are turned inwardly toward the side wall of the car. In order to lock the cams in position, so as to hold the door tightly in place, I mount a pawl S on the rod Q, which pawl coöperates with a rack T, secured to the side of the car. It will readily be seen that as the rod Q moves on an arc of a circle described from the axis of the crank-arm—that is, inwardly and downwardly—this pawl will fall back by gravity under the teeth of the rack and lock the rod in place when it has completed its movement. In order to release the rod, it is only necessary to place the wrench in position and press the rod downwardly to free the pawl, which can be turned back out of engagement with the rack. The pawl can also be used to hold the cams in their raised position to permit the movement of the door in opening or closing, as shown by the dotted lines of Fig. 16.

I am aware that many minor changes in the construction, arrangement, and combination of the several parts of my device can be made and substituted for those herein shown and described without in the least departing from the nature and principle of my invention.

Having thus described my invention, what I claim, and desire to secure by Letters Patent of the United States, is—

1. The combination with the post E, of crank-arms mounted therein, a rod connecting said crank-arms, cams on the inner ends of the crank-arm shafts, and a door with which said cams coöperate, substantially as described.

2. The combination with the post E, of crank-arms mounted therein, a rod connected to said crank-arms for operating them in unison, means for locking said rod in certain of its positions, cams on the inner ends of the shafts of the crank-arms, and a door having a shouldered front edge with which shoulders the cams coöperate, substantially as described.

3. The combination with a car-door, of cams coöperating therewith to force the door tightly home, said cams being in line with the movement of the door and so arranged that they are within the line of the outer face of the door, substantially as described.

4. The combination with a car, of a door, a series of connected crank-arms mounted on the side wall of the car, and having cams on their inner ends for coöperating with the front edge of the door, and means arranged upon one of said crank-arms for affording a leverage to operate all of the crank-arms and cams simultaneously, substantially as described.

5. The combination with a car, of a door, cams mounted on the side wall of the car, for engaging the front edge of the door and forcing the same into its jambs, crank-arms for partially rotating said cams, said crank-arms extending out from the cams, a rod for operating said crank-arms and cams, and means arranged upon one of said crank-arms for affording a leverage to operate the same, substantially as described.

6. The combination with a car, of a door, cams mounted on the side wall of the car, for engaging the front edge of the door and forcing the same into its jambs, crank-arms for partially rotating said cams, said crank-arms extending out from the cams, a rod for operating said crank-arms and cams, means for locking said rod in certain of its positions, and a wrench arranged upon one of said crank-arms for partially revolving the same, substantially as described.

7. The combination with a car, of a door, cams mounted on the side wall of the car, for engaging the front edge of the door and forcing the same into its jambs, crank-arms for partially rotating said cams, said crank-arms extending out from the cams, a rod for operating said crank-arms and cams, a pawl on said rod, and a rack arranged in juxtaposition to said pawl, and with which said pawl engages to lock the rod in certain of its positions, and means arranged upon one of said crank-arms for affording a leverage to operate the same, substantially as described.

8. The combination with a car-door, of cams coöperating with the edge thereof, a squared shank extending from one of said cams, a stud projecting from said squared shank, a wrench slidingly mounted upon said stud for coöperating with the squared shank, and means connecting all of said cams together, substantially as described.

9. The combination with a car-door and its tracks, of vertically-reciprocating rods arranged on the door, said rods having cam-faces for coöperating with the door-tracks, and means for reciprocating the rods to throw their carried cams into or out of engagement with the tracks, substantially as described.

10. The combination with a car-door and its tracks, of rods mounted on the door, said rods having cams on their ends for engaging the tracks, and means for simultaneously operating said rods to wedge the cams behind the tracks, or withdraw said cams from engagement with the tracks, substantially as described.

11. The combination with a car-door, of rods arranged upon its edge, said rods having cam-faces for coöperating with the door-tracks, a rotary member to which said rods are connected, and a handle, in the form of a hasp, pivoted to said rotary member, substantially as described.

12. The combination with a car-door, of rods which are adapted to engage the door-tracks, a rotary device to which said rods are connected, a handle pivoted to one side of the pivotal point of said rotary device, a nose on the inner end of the handle, and a loop-fulcrum with which said nose is adapted to coöperate, substantially as described.

13. The combination with a car-door, of a disk mounted on its edge, a handle pivoted to one side of said disk, rods mounted in the disk and coöperating with the door-tracks, and a lug or projection $i$, with which the handle coöperates when in a closed position, substantially as described.

14. The combination with a car-door, of a rotary disk mounted on the edge of the door, a handle pivoted to one side of the pivot-point of said disk, a nose on the inner end of the handle, and a loop-fulcrum mounted in a countersunk frame so as to fold back out of the path of the sliding door, said nose coöperating with said loop-fulcrum when the handle is in a horizontal position, substantially as described.

15. In a car-door, the combination with a rotary disk, of a handle attached to said disk, means engaged by the handle for forcing the door inwardly when the handle is closed, rods connected to the disk for engaging the door-tracks to force the door inwardly, and projections on said disk to force the door outwardly when the handle disengages the several devices which lock the door in place, substantially as described.

16. The combination with a car, of a door, tracks for said door, rods arranged on the edge of the door for coöperating with the tracks, to force the door into its jambs, a rotary disk to which said rods are connected, a pivoted handle in the form of a hasp, for operating said disk, and radial enlargements on said disk for coöperating with the side wall of the car to force the door outwardly when the disk is rotated to disengage the rods from the tracks, substantially as described.

17. The combination with a car-door, and its tracks, of vertically-reciprocating rods mounted on the door, said rods having cams on their ends for engaging the tracks, adjustable guides for said rods, and means for reciprocating the rods to throw their carried cams into or out of engagement with the tracks, substantially as described.

18. The combination with a car, of a door, tracks for said door, rollers mounted in suitable castings secured to the lower edge of the door, for coöperating with the lower track, fins projecting from the door to behind the tracks, cams mounted on the side wall of the car, and coöperating with the front edge of the door for forcing the front end of the door into its jambs, and cam-rods mounted on the rear edge of the door and coöperating with the track for forcing the rear end of the door into its jambs, substantially as described.

In testimony whereof I hereunto affix my signature, in presence of two witnesses, this 13th day of November, 1896.

ANDREW G. STEINBRENNER.

Witnesses:
F. R. CORNWALL,
G. A. PENNINGTON.